United States Patent
Lu et al.

(10) Patent No.: US 10,979,409 B2
(45) Date of Patent: Apr. 13, 2021

(54) BLUETOOTH DEVICE AND WORKING METHOD THEREOF

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 275 days.

(21) Appl. No.: 16/189,737

(22) Filed: Nov. 13, 2018

(65) Prior Publication Data

US 2019/0081937 A1 Mar. 14, 2019

Related U.S. Application Data

(63) Continuation of application No. PCT/CN2017/084234, filed on May 12, 2017.

(30) Foreign Application Priority Data

Jun. 24, 2016 (CN) .......................... 201610471163.7

(51) Int. Cl.
*H04W 4/80* (2018.01)
*H04L 29/06* (2006.01)
(Continued)

(52) U.S. Cl.
CPC ........ *H04L 63/061* (2013.01); *H04L 63/0492* (2013.01); *H04L 63/0876* (2013.01);
(Continued)

(58) Field of Classification Search
USPC .......... 380/27, 255, 264, 276; 726/2, 21, 36; 713/150, 163, 181
See application file for complete search history.

(56) References Cited

U.S. PATENT DOCUMENTS

2007/0123166 A1* 5/2007 Sheynman ........ H04M 1/72412
455/41.2
2009/0249478 A1* 10/2009 Rosener .............. H04L 63/0853
726/19
(Continued)

FOREIGN PATENT DOCUMENTS

CN 1735194 A 2/2006
CN 102420642 A 4/2012
(Continued)

OTHER PUBLICATIONS

The International Search Report of corresponding International PCT Application No. PCT/CN2017/084234, dated Aug. 16, 2017.
(Continued)

*Primary Examiner* — Sharif E Ullah
(74) *Attorney, Agent, or Firm* — J.C. Patents

(57) ABSTRACT

The present disclosure provides a Bluetooth device and a working method thereof, which relates to application in information security field. The Bluetooth device includes a Bluetooth connecting module, a pairing module and a data communicating module. The working method includes a Bluetooth connecting process, a pairing process and a data communicating process, where the pairing process includes that the device computes an encryption key according to a preset authentication code, a first random number obtained from an initiator, a second random number generated by the device, encrypt the link encryption data containing a link encryption key by using the encryption key to obtain a link encryption request and sends the link encryption request to the imitator, and the initiator obtains the link encryption key from the link encryption request. The disclosure is compatible to the present Bluetooth protocol and enhances security in the Bluetooth device pairing process as well.

20 Claims, 4 Drawing Sheets

(51) Int. Cl.
*H04W 76/14* (2018.01)
*H04W 12/04* (2021.01)
*H04W 12/06* (2021.01)
*H04W 84/18* (2009.01)

(52) U.S. Cl.
CPC ............. *H04L 63/162* (2013.01); *H04W 4/80* (2018.02); *H04W 12/04* (2013.01); *H04W 12/06* (2013.01); *H04W 76/14* (2018.02); *H04W 84/18* (2013.01)

(56) References Cited

U.S. PATENT DOCUMENTS

| | | | |
|---|---|---|---|
| 2009/0325566 A1* | 12/2009 | Bell | H04W 8/22 455/419 |
| 2011/0195665 A1 | 8/2011 | Friedlaender | 455/41.2 |
| 2013/0344812 A1* | 12/2013 | Dees | H04L 63/18 455/41.2 |
| 2015/0319557 A1* | 11/2015 | El-Hoiydi | H04W 4/60 455/41.2 |
| 2017/0093822 A1* | 3/2017 | Gutierrez | H04L 63/061 |
| 2017/0351630 A1* | 12/2017 | Li | H04L 43/0811 |
| 2019/0192768 A1* | 6/2019 | Gupta | A61M 5/14276 |
| 2019/0253997 A1* | 8/2019 | Hermann | G01S 1/08 |
| 2019/0372679 A1* | 12/2019 | Levionnais | G06Q 20/3278 |

FOREIGN PATENT DOCUMENTS

| | | |
|---|---|---|
| CN | 103179679 A | 6/2013 |
| CN | 104717762 A | 6/2015 |
| CN | 105246026 A | 1/2016 |
| CN | 105430605 A | 3/2016 |
| CN | 105450269 A | 3/2016 |
| CN | 105933039 A | 9/2016 |
| WO | WO 2004/100445 A2 | 11/2004 |

OTHER PUBLICATIONS

The Chinese First Examination Report of corresponding China patent application No. 201610471163.7, dated Oct. 24, 2017.

* cited by examiner

BLUETOOTH DEVICE AND WORKING METHOD THEREOF

CROSS-REFERENCE TO RELATED APPLICATIONS

This application is a continuation of International Application No. PCT/CN2017/084234, filed on May 12, 2017, which claims priority to Chinese Patent Application No. 201610471163.7, filed on Jun. 24, 2016. The disclosures of the aforementioned applications are hereby incorporated by reference in their entireties.

TECHNICAL FIELD

The present disclosure relates to information security field, more particularly to a Bluetooth device and a working method thereof.

BACKGROUND

Bluetooth device is a wireless communication electronic product designed according to Bluetooth technology, which supports short distance communication with features of short delay time and stable connection.

For products such as a Bluetooth device, pairing is very important. Building a Bluetooth connection between two devices and completing a pairing process represent that a security channel is built up and secure data communication can be started between the devices. In the prior art, some mobile devices (such as a cellphone with a Bluetooth function) can provide screen and keyboard entry for a user, which is convenient for the user to freely select a Bluetooth device which is permitted to be paired; for a Bluetooth device without screen and keyboard entry, how to pair the Bluetooth device only with a Bluetooth device which is permitted to be paired by the user becomes a technical problem to be solved urgently.

SUMMARY

In order to solve the problem in the prior art, the present disclosure provide a Bluetooth device and a working method thereof.

The technical solution adopted by the present disclosure is as follows: a Bluetooth device, including a Bluetooth connecting module, a pairing module, and a data communicating module;

the Bluetooth connecting module is configured to, upon receiving a Bluetooth connecting event, build a Bluetooth connection with an initiator which initiates the connection, obtain a MAC address of the initiator and stores the MAC address of the initiator.

the pairing module specifically includes a first transceiving unit, a first computing unit, a second transceiving unit, a verifying unit, a second computing unit and a link encrypting unit;

the first transceiving unit is configured to receive a pairing confirming request sent from the initiator, obtain a first confirming value from the pairing confirming request and generate a second random number; the first transceiving unit is further configured to return a second confirming value computed by the first computing unit to the initiator;

the first computing unit is configured to compute the second confirming value according to a preset authentication code, the second random number generated by the first transceiving unit, a currently stored MAC address of the initiator, and MAC address of the Bluetooth device;

the second transceiving unit is configured to receive a random number exchanging request sent from the initiator, and obtain a first random number form the random number exchanging request; return the second random number generated by the first transceiving unit to the initiator and trigger the second computing unit when a verifying result of the verifying unit is verifying passed; return an error to the initiator when the verifying result of the verifying unit is verifying unpassed;

the verifying unit is configured to verify the first confirming value obtained by the first transceiving unit according to the first random number obtained by the second transceiving unit;

the second computing unit is configured to compute an encryption key according to the preset authentication code, the first random number obtained by the second transceiving unit, and the second random number generated by the first transceiving unit;

the link encrypting unit is configured to form link encryption data according to the first data, the second data and the third data which are preset, encrypt the link encryption data using the encryption key computed by the second computing unit to obtain a link encryption request and send the link encryption request to the initiator, and set the first data as the link encryption key; and the data communicating module specifically is configured to receive operating data sent from the initiator, decrypt the operating data using the link encryption key obtained by the pairing module, perform a corresponding operation according to a decrypting result, return an operating response obtained by encrypting the link encryption key to the initiator.

Further, the verifying unit specifically is configured to compute a comparing value according to the first random number, the preset authentication code, the MAC address of the initiator and the MAC address of the device, compare the first comparing value and the first confirming value and determine whether the first comparing value and the first confirming value are identical.

Further, the pairing module includes a third transceiving unit, a first determining unit, a second determining unit, a third determining unit and a mode setting unit;

the third transceiving unit is configured to receive a pairing exchanging request sent from the initiator, return preset data to the initiator upon receiving the triggering of the first determining unit, return information representing that the key length is not supported to the initiator upon receiving the triggering of the second determining unit, return information representing that pairing is refused to the initiator upon receiving the triggering of the third determining unit;

the first determining unit is configured to determine whether the current mode is a pairing mode, if yes, trigger the second determining unit, otherwise, trigger the third transceiving unit and the third determining unit;

the second determining unit is configured to determine whether the device supports the key length specified in the pairing exchanging request, if yes, return a pairing exchanging response to the initiator, otherwise, trigger the third transceiving unit;

the third determining unit is configured to determine whether a long time key pressing operation is performed, if yes, trigger the second determining unit, otherwise, trigger the third transceiving unit;

the mode setting unit is configured to set the current mode as the pairing mode after the device is powered up, and is further configured to set the current mode as a non-pairing mode after the pairing module completes the pairing.

Further, the mode setting unit is configured to determine a way of powering up after the device is powered up, if the way is short time key pressing powering up, determine whether a long time key pressing operation is performed, if yes, set a pairing mode flag, switch on Bluetooth broadcast and wait for Bluetooth connection; otherwise, switch on the Bluetooth broadcast and wait for the Bluetooth connection; if the way is long time key pressing powering up, set the pairing mode flag, switch on the Bluetooth broadcast and wait for the Bluetooth connection; the mode setting unit is further configured to reset the pairing mode flag after the pairing module completes the pairing.

Further, the Bluetooth connecting module is configured to, after obtaining the MAC address of the initiator, determine whether the initiator is a bound device according to the MAC address of the initiator, if yes, obtain pairing information corresponding to the initiator according to the MAC address of the initiator, take first data in the pairing information as the link encryption key and trigger the data communicating module; otherwise, trigger the pairing module;

the pairing information corresponding to the initiator includes the MAC address of the initiator, the first data, the second data and the third data.

Further, the Bluetooth connecting module is configured to, upon obtaining the MAC address of the initiator and when the two bits started from the high order bit of the MAC address of the initiator are preset values, receive an identity analyzing key of the initiator, determine whether the initiator is a bound device according to the identity analyzing key of the initiator, if yes, obtain pairing information corresponding to the initiator according to the identity analyzing key of the initiator, take first data in the pairing information as the link encryption key and trigger the data communicating module; otherwise, trigger the pairing module;

the pairing information corresponding to the initiator includes the MAC address of the initiator, the first data, the second data, the third data and the identity analyzing key of the initiator.

Further, the pairing module includes a storing unit configured to store the pairing information corresponding to the initiator for the initiator.

Further, the pairing information includes a bound number; the storing unit is specifically configured to determine whether a number of bound devices has reached an upper limit value according to a bound number included in the currently stored pairing information, if yes, after clearing a piece of pairing information in the currently stored pairing information according to the upper limit value, store the pairing information corresponding to the initiator for the initiator; otherwise, set the bound number in the pairing information corresponding to the initiator according to the bound number included in all the currently stored pairing information, and store the pairing information corresponding to the initiator for the initiator.

A working method of a Bluetooth device, including a Bluetooth connecting process, a pairing process and a data communicating process between the device and an imitator, the pairing process including:

Step S1, when the device receives a pairing confirming request sent from the initiator, obtaining, by the device, a first confirming value from the pairing confirming request and generating a second random number, computing a second confirming value according to a preset authentication code, the second random number, a currently stored MAC address of the initiator and the MAC address of the device, and returning the second confirming value to the initiator;

Step S2, when the device receives a random number exchanging request sent from the initiator, obtaining, by the device, a first random number from the random number exchanging request; verifying the first confirming value according to the first random number, executing Step S3 if verifying is passed; executing Step S5 if verifying is unpassed;

Step S3, returning, by the device, the second random number to the initiator;

Step S4, computing, by the device, a encryption key by performing computing according to the preset authentication code, the first random number, the second random number; forming link encryption data according to first data, a second data and a third data which are preset, encrypting the link encryption data by using the encryption key to obtain a link encryption request, sending the link encryption request to the initiator, and taking the first data as the link encryption key, thereby ending the pairing process;

Step S5, returning, by the device, an error to the initiator, and ending the pairing process.

Further, verifying the first confirming value according to the first random number specifically is: computing a first comparing value according to the first random number, the preset authentication code, the currently stored MAC address of the initiator and the MAC address of the device, comparing the first comparing value and the first confirming value to determine whether the first comparing value and the first confirming value are identical, if yes, the verifying is passed, otherwise, the verifying is unpassed.

The pairing process further includes, performing the following steps by the device upon receiving a pairing exchanging request sent from the initiator:

Step A, determining whether a current mode is pairing mode, if yes, executing Step B, otherwise, executing Step B';

Step B, determining whether key length specified in the pairing exchanging request is supported, if yes, returning pairing exchanging response to the initiator; otherwise, returning information representing that the key length is not supported to the initiator;

Step B', returning preset data to the initiator and determining whether a long time key pressing operation is performed, if yes, executing Step B; otherwise, returning information representing that the pairing is refused to the initiator;

the method further includes: setting the current mode as a pairing mode after the device is powered up; after ending the pairing process in Step S4, the method further includes: modifying, by the device, the current mode as the non-pairing mode.

Further, setting the current mode as the pairing mode after the device is powered up specifically includes: powering the device up and determining the way of powering up, determining whether a long time key pressing operation is performed if the way of powering up is short time key pressing powering up, if yes, setting a pairing mode flag, switching on the Bluetooth broadcast and waiting for the Bluetooth connection; otherwise, switching on the Bluetooth broadcast and waiting for the Bluetooth connection; if the way of powering up is long time key pressing powering up, setting the pairing mode flag, switching on the Bluetooth broadcast and waiting for the Bluetooth connection; modifying the current mode as the non-pairing mode specifically is: resetting the pairing mode flag.

The above Bluetooth connecting process includes:

Step 1, when the device receives a Bluetooth connecting event, building, by the device, Bluetooth connection with the initiator which initiates the connection, obtaining the MAC address of the initiator and storing the MAC address of the initiator;

Step 2, waiting, by the device, to receive a data request sent by the initiator, executing Step S1 in the case that the received data request is a pairing confirming request; executing Step S2 in the case that the received data request is random number exchanging request.

Further, after the device obtains the MAC address of the initiator in Step 1, the method further includes: determining, by the device, whether the initiator is a bound device according to the MAC address of the initiator, if yes, obtaining the pairing information corresponding to the initiator according to the MAC address of the initiator, taking the first data in the pairing information as the link encryption key and entering the data communicating process; otherwise performing the Step 2;

the pairing information corresponding to the initiator includes the MAC address of the initiator, the first data, the second data and the third data.

Further, in Step 1 when the device obtains the MAC address of the initiator and the two bits started from the high order bit of the MAC address of the initiator are preset values, the method further includes: receiving, by the device, an identity analyzing key of the initiator, determining whether the initiator is a bound device according to the identity analyzing key of the initiator, if yes, obtaining pairing information corresponding to the initiator according to the identity analyzing key of the initiator, taking the first data in the pairing information as the link encryption key and entering the data communication process; otherwise, performing the Step 2;

The pairing information corresponding to the initiator includes the MAC address of the initiator, the first data, the second data, the third data and the identity analyzing key of the initiator.

When the pairing process is ended in Step S4, the method further includes: storing, by the device, the pairing information corresponding to the initiator for the initiator.

The above data communication process includes: upon receiving operating data sent by the initiator, decrypting, by the device, the operating data by using the link encryption key, performing a corresponding operation according to decrypting result, returning an operating response obtained by encrypting with the link encryption key to the initiator.

The advantageous effect of the present disclosure is that the Bluetooth device and the working method thereof provided by the present disclosure enhances security of pairing and is compatible with the Bluetooth protocol, which avoids the problem that an unknown device without a permit tries to be paired with a device of the user.

DESCRIPTION OF EMBODIMENTS

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those of ordinary skill in the art without any creative work are within the scope of the disclosure.

Embodiment 1

Figure 1:
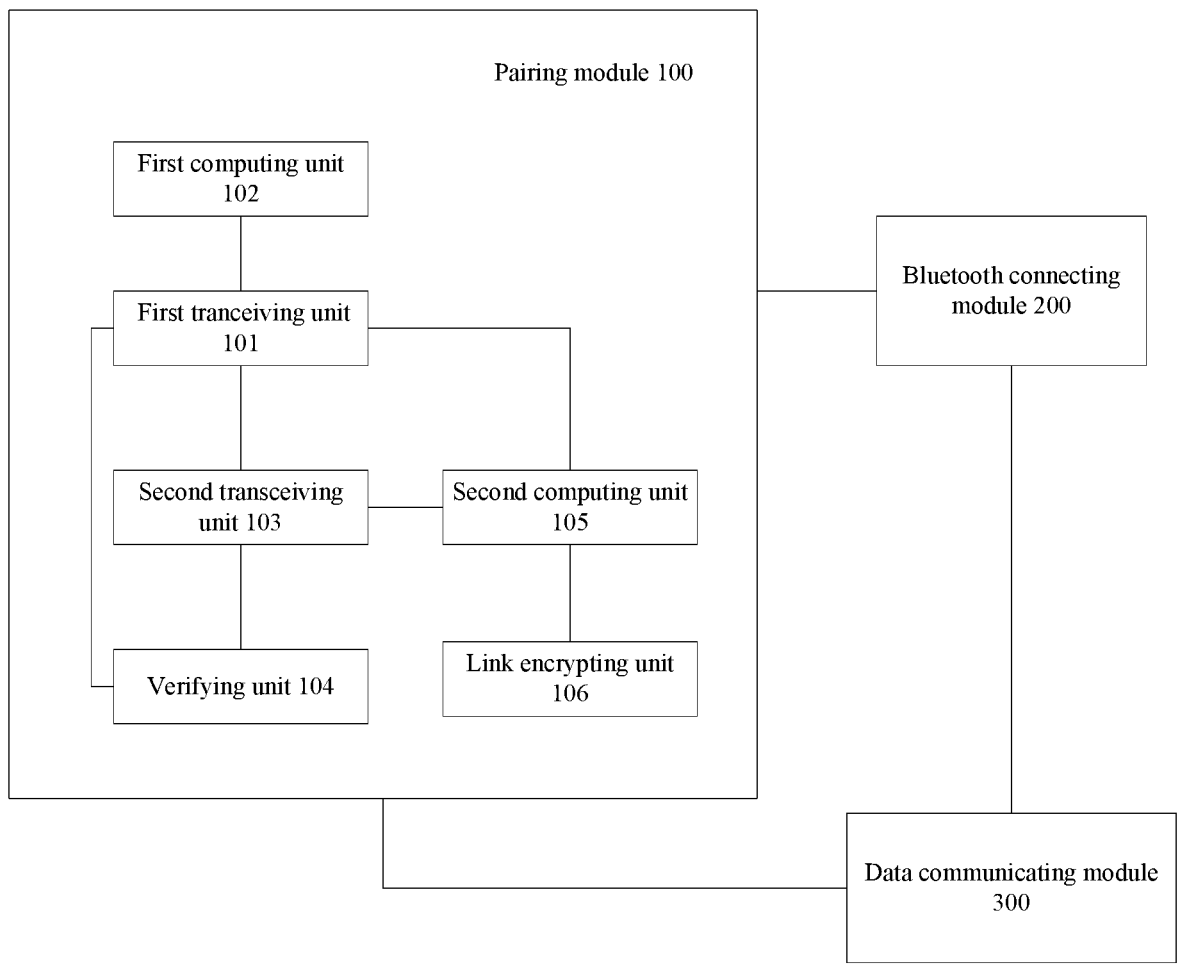
FIG. 1 is a constitutional diagram of modules of a Bluetooth device provided by Embodiment 1.

FIG. 1 provides a constitutional diagram of modules of a Bluetooth device provided by Embodiment 1. The present embodiment provides a Bluetooth device, as shown by FIG. 1, which includes a Bluetooth connecting module 200, a pairing module 100 and a data communicating module 300. In this case, the Bluetooth connecting module 200 is configured to, upon receiving a Bluetooth connecting event, build a Bluetooth connection with an initiator which initiates the connection, obtain a MAC address of the initiator and stores the MAC address of the initiator;

the Bluetooth connecting module 200 is connected to the pairing module 100 and the data communicating module 300, and is specifically configured to determine whether the initiator is a bound device according to the MAC address of the initiator after obtaining the MAC address of the initiator, if yes, obtain pairing information corresponding to the initiator according to the MAC address of the initiator, take first data in the pairing information as a link encryption key and trigger the data communicating module 300; otherwise, trigger the pairing module 100; the pairing information of the initiator includes the MAC address of the initiator, the first data, second data and third data.

Alternatively, the Bluetooth connecting module 200 is specifically configured to, in a case that the MAC address of the initiator is obtained and the two bits from the high order bit of the MAC address of the initiator are preset values, receive an identity analyzing key of the initiator, determine whether the initiator is a bound device according to the identity analyzing key of the initiator, if yes, obtain the pairing information corresponding to the initiator according to the identity analyzing key of the initiator, take the first data in the pairing information as the link encryption key and trigger the data communicating module 300; otherwise, trigger the pairing module 100; where the pairing information corresponding to the initiator includes the MAC address of the initiator, the first data, the second data, the third data and the identity analyzing key of the initiator.

In the present embodiment, the pairing module 100 specifically includes a first transceiving unit 101, a first computing unit 102, a second transceiving unit 103, a verifying unit 104, a second computing unit 105 and a link encrypting unit 106;

The first transceiving unit 101 is configured to receive a pairing confirming request sent from the initiator, obtain a first confirming value from the pairing confirming request and generate a second random number; the first transceiving unit 101 is further configured to return the second confirming value computed by the first computing unit 102 to the initiator;

The first computing unit 102 is configured to compute a second confirming value according to a preset authentication code, the second random number generated by the first transceiving unit, a currently stored MAC address of the initiator and the MAC address of the Bluetooth device;

The second transceiving unit 103 is configured to receive a random number exchanging request sent from the initiator, obtain a first random number form the random number exchanging request; return the second random number generated by the first transceiving unit 101 and trigger the second computing unit 105 when a verifying result of the verifying unit 104 is verifying passed; return an error to the initiator in the case that verifying result of the verifying unit 104 is verifying unpassed;

The verifying unit 104 is configured to verify the first confirming value obtained by the first transceiving unit 101 according to the first random number obtained by the second transceiving unit 103; specifically the verifying unit 104 is configured to compute a comparing value according to the first random number, the preset authentication code, the MAC address of the initiator and the MAC address of the Bluetooth device, compare the first comparing value and the first confirming value and determine whether the first comparing value and the first confirming value are identical.

The second computing unit 105 is configured to compute an encryption key according to the preset authentication code, the first random number obtained by the second transceiving unit 103, the second random number generated by the first transceiving unit 101;

The link encrypting unit 106 is configured to form link encryption data according to the first data, the second data and the third data which are preset, encrypt the link encryption data using the encryption key computed by the second computing unit 105 to obtain a link encryption request and send the link encryption request to the initiator, and set the first data as the link encryption key.

Preferably, the pairing module in the present embodiment further includes a third transceiving unit, a first determining unit, a second determining unit, a third determining unit and a mode setting unit;

the third transceiving unit is configured to receive a pairing exchanging request sent from the initiator, return preset data to the initiator upon receiving the triggering of the first determining unit, return information representing that key length is not supported to the initiator upon receiving the triggering of the second determining unit, return information representing that pairing is refused to the initiator upon receiving the triggering of the third determining unit;

the first determining unit is configured to determine whether the current mode is a pairing mode, if yes, trigger the second determining unit, otherwise, trigger the third transceiving unit and the third determining unit;

the second determining unit is configured to determine whether the device supports the key length specified in the pairing exchanging request, if yes, return pairing exchanging response to the initiator, otherwise, trigger the third transceiving unit;

the third determining unit is configured to determine whether a long time key pressing operation is performed, if yes, trigger the second determining unit, otherwise, trigger the third transceiving unit;

The mode setting unit is configured to set the current mode as the pairing mode after the device is powered up; the mode setting unit is further configured to set the current mode as a non-pairing mode after the pairing module completes the pairing. Specifically, the mode setting unit is configured to determine a way of powering up after the device is powered up, if the way is short time key pressing powering up, determine whether a long time key pressing operation is performed, if yes, set a pairing mode flag, switch on Bluetooth broadcast, and wait for Bluetooth connection; otherwise, switch on the Bluetooth broadcast, wait for the Bluetooth connection; if the way is long time key pressing powering up, set the pairing module flag, switch on the Bluetooth broadcast, wait for the Bluetooth connection; the mode setting unit is further configured to reset the pairing mode flag after the pairing module completes pairing.

Further, in the present embodiment, the pairing module further includes a storing unit, the storing unit is configured to store the pairing information corresponding to the initiator, for the initiator.

When the pairing information further includes a bound number, the storing unit is specifically configured to determine whether a number of bound devices has reached an upper limit value according to a bound number included in the currently stored pairing information, if yes, after clearing a piece of pairing information in the currently stored pairing information according to the upper limit value, store the pairing information corresponding to the initiator for the initiator; otherwise, set the bound number in the pairing information corresponding to the initiator according to the bound number included in all the currently stored pairing information, and store the pairing information corresponding to the initiator for the initiator. For example, the upper limit value is 10. When the number of the bound devices reaches 10, according to first in first out principle, a piece of pairing information including a bound number of 1 is found and deleted from the currently stored pairing information. 1 is deducted respectively from the bound number included in the currently stored pairing information, and the pairing information corresponding to the initiator is stored, in which the bound number included is 10. When the number of the bound devices has not reached 10 and if the maximum value of the bound number included in the currently stored pairing information is 2, the pairing information corresponding to the initiator is stored for the initiator, in which the bound number included is 3.

In the present embodiment, the data communicating module is specifically configured to receive operating data sent from the initiator, decrypt the operating data using the link encryption key obtained by the pairing module, perform a corresponding operation according to a decrypting result, return an operating response obtained by encrypting the link encryption key to the initiator.

Embodiment 2

The present embodiment provides a working method for the Bluetooth device in Embodiment 1, which includes a Bluetooth connecting process, a pairing process and a data communicating process. In this case, the pairing process includes the following steps:

Step S1, in the case that the device receives a pairing confirming request sent from the initiator, the device receives a first confirming value from the pairing confirming request and generates a second random number; the device computes a second confirming value according to a preset authentication code, the second random number, a currently stored MAC address of the initiator and the MAC address of the device, and returns the second confirming value to the initiator;

Step S2, in the case that the device receives a random number exchanging request from the initiator, the device obtains a first random number from the random number exchanging request; the device verifies the first confirming value according to the first random number, if verifying is passed, executes Step S3; if verifying is unpassed, executes Step S5;

Step S3, the device returns the second random number to the initiator;

Step S4, the device obtains an encryption key according to the preset authentication code, the first random number, and the second random number; the device forms link encryption data according to first data, a second data and a third data which are preset, encrypts the link encryption data by using the encryption key to obtain a link encryption request and sends the link encryption request to the initiator, taking the first data as the link encryption key, storing pairing information corresponding to the initiator for the initiator, and the pairing process ends;

In Step S4, the pairing information corresponding to the initiator includes the MAC address of the initiator, the first data, the second data and the third data.

Step S5, the device returns an error to the initiator, and the pairing process ends.

Further, the pairing information corresponding to the initiator may include a bound number. In the case that the pairing information includes the bound number, before storing the pairing information corresponding to the initiator in Step S4 the method further includes: determining whether the number of currently bound devices reaches an upper limit value according to a bound number included in all the stored pairing information, if yes, clearing a piece of pairing information from the currently stored pairing information according to the upper limit value; otherwise, setting the bound number included in the pairing information corresponding to the initiator according to the bound number included in all the pairing information stored in the device currently. For example, the upper limit value is 3; in the case that the number of bound devices does not reach 3, and the maximum value of the bound number included in all the currently stored pairing information is 1, the device stores the pairing information corresponding to the initiator for the initiator, in which the bonding number included is 2.

Further, the pairing process includes that, in the case that the device receives a pairing exchanging request sent from the initiator, the device executes the following steps:

Step A, the device determines whether the current mode is a pairing mode, if yes, executes Step B; otherwise, executes Step B';

Step B, the device determines whether a specified key length in the pairing exchanging request is supported, if yes, returns a pairing exchanging response to the initiator, otherwise, returns information representing that the key length is not supported to the initiator;

Step B', the device returns preset data to the initiator, determines whether a long time key pressing operation is performed, if yes, executes Step B; otherwise, returns information representing that pairing is refused to the initiator;

The present method further includes: after powering up, the device sets, the current mode as the pairing mode; after the pairing process ends, Step S4 further includes that the device modifies the current mode as the non-pairing mode.

Preferably, the Bluetooth connecting process provided by the present embodiment includes:

Step 1, in the case that the device receives a Bluetooth connecting event, the device builds a Bluetooth connection with the initiator which initiates the connection, obtains the MAC address of the initiator and stores the MAC address of the initiator;

Step 2, the device waits to receive a data request sent from the initiator, in the case that the received data request is a pairing confirming request, executes Step S1; in the case that the received data request is a random number exchanging request, executes Step S2; and in the case that the received data request is a pairing exchanging request, executes Step A.

In the above Step 1, in the case that the device obtains the MAC address of the initiator and the two bits from the high order bit of the MAC address of the initiator are preset values, the method further includes that the device receives an identity analyzing key of the initiator, determines whether the initiator is a bound device according to the identity analyzing key of the initiator, if yes, obtains pairing information corresponding to the initiator according to the identity analyzing key of the initiator, takes the first data in the pairing information as a link encryption key, enters the data communicating process; otherwise, executes Step 2; correspondingly, the pairing information further includes the identity analyzing key of the initiator.

Embodiment 3

Figure 2:
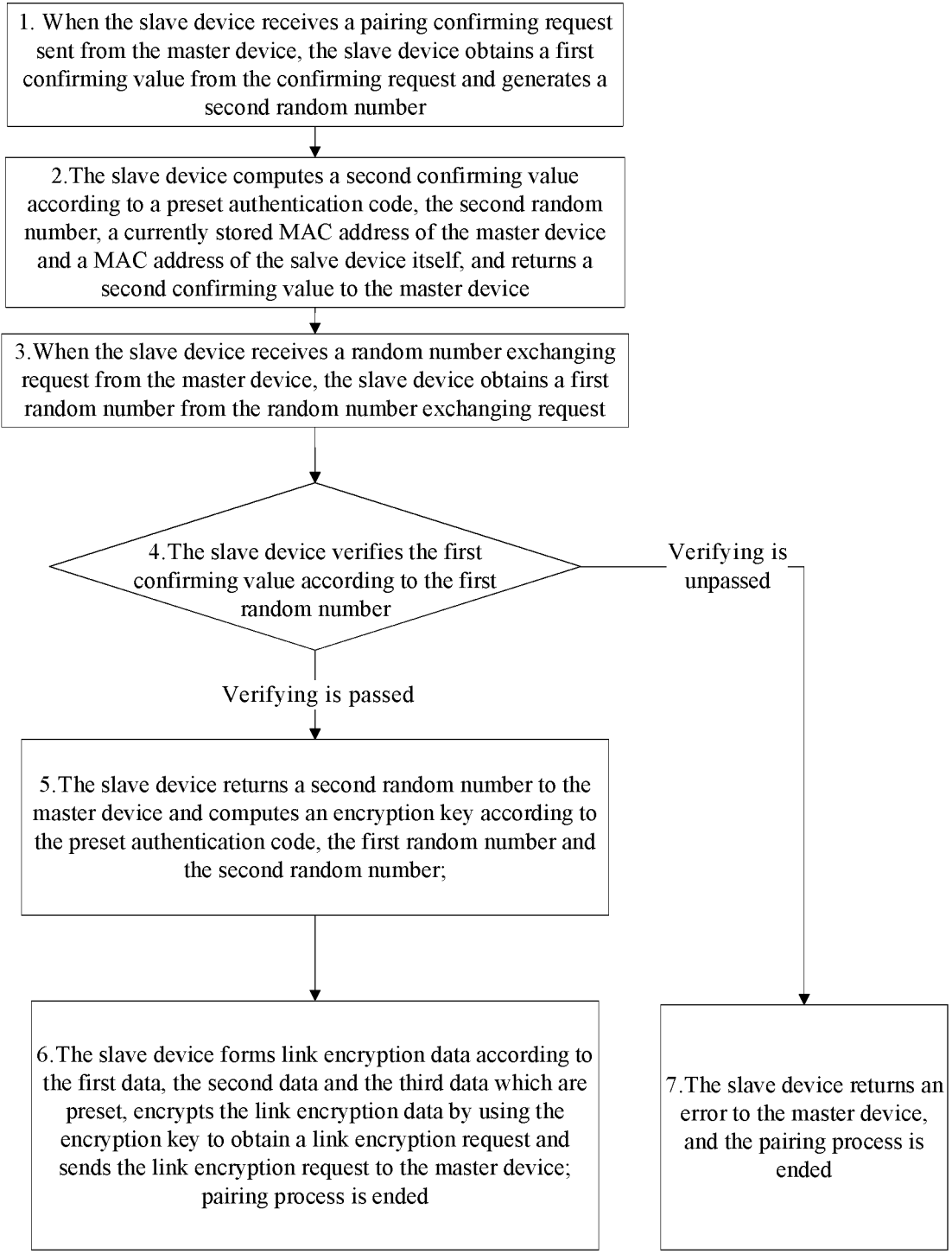
FIG. 2 is a flow chart of pairing method of a Bluetooth device provided by Embodiment 3.

Based on Embodiment 2, FIG. 2 is a flow chart of pairing method of a Bluetooth device provided by Embodiment 3. The present embodiment provides a pairing method of a Bluetooth device. For example, the Bluetooth device, which is called a slave device, is paired with an initiator which is called a master device. As shown by FIG. 2, the operation of the slave device in the pairing process includes following steps:

Step 1, when the slave device receives a pairing confirming request sent from the master device, the slave device obtains a first confirming value from the confirming request and generates a second random number;

Step 2, the slave device computes a second confirming value according to a preset authentication code, the second random number, a currently stored MAC address of the master device and a MAC address of the salve device itself, and returns a second confirming value to the master device;

Step 3, when the slave device receives a random number exchanging request from the master device, the slave device obtains a first random number from the random number exchanging request;

Step 4, the slave device verifies the first confirming value according to the first random number, if verifying is Step 5 is executed; if verifying is Step 7 is executed;

Specifically, the slave device computes a first comparing value according to the first random number, the preset authentication code, the currently stored MAC address of the master device and the MAC address of the slave device, compares the first comparing value and the first confirming value, and determines whether the first comparing value and the first confirming value are identical, if yes, verifying is passed; otherwise, verifying is unpassed.

Step 5, the slave device returns a second random number to the master device and computes an encryption key according to the preset authentication code, the first random number and the second random number;

Step 6, the slave device forms link encryption data according to the first data, the second data and the third data which are preset, encrypts the link encryption data by using the encryption key to obtain a link encryption request and sends the link encryption request to the master device; pairing process is ended;

Preferably, the preset first data is a link encryption key. In terms of the preset third data in Step 6, it may also be the case that the slave device generates the third random number and stores the third random number as the third data.

Step 6 may further include that the slave device obtains the pairing information corresponding to the master device and stores the pairing information. Preferably, the pairing information corresponding to the master device includes the MAC address of the master device, the first data (LTK), the second data (EDIV) and the third data (Rand).

Preferably, when the slave device obtains the MAC address of the master device, the method further includes that the slave device determines whether the master device is a bound device according to the MAC address of the master device, if yes, communicates with the master device by using the first data in the pairing information corresponding to the MAC address of the master device as the link encryption key; otherwise, the slave device executes the pairing process of the present disclosure and stores the pairing information corresponding to the master device when pairing process is ended.

When two bits from the high order bit of the MAC address of the master device are 10, the slave device can further obtain an identity analyzing key of the master device (IRK). Correspondingly, the pairing information further includes the identity analyzing key of the master device. Preferably, when the salve device obtains the IRK of the master device, the slave device determines whether the master device is a bound device according to the IRK, if yes, the slave device communicates with the master device by using the first data in the pairing information corresponding to the IRK as the link encryption key; otherwise, the slave device executes the pairing process of the present disclosure and stores the pairing information corresponding to the master device after the pairing process is ended.

In the case that the slave device is set with a maximum number of bound devices, the pairing information further includes a bound number. Correspondingly, before the slave device stores the pairing information, the method further includes that the slave device determines whether the number of the bound devices reaches an upper limit value according to a bound number included in the stored pairing information, if yes, clears the pairing information corresponding to the upper limit value from the stored pairing information, adds 1 to the bound number included in all the stored pairing information and sets the bound number corresponding to the current master device as an initial value; otherwise, sets the bound number corresponding to the master device to be a sum of the maximum value of the bound number included in the currently stored pairing information and 1, for example, the upper limit value is 10; the initial value is 1.

Step 7, the slave device returns an error to the master device, and the pairing process is ended.

Further, in order to correspond to the flow as shown in FIG. 2, the master device executes the following steps in the case that the master device receives a user operation in the Bluetooth pairing process:

Step a1, the master device generates the first random number, computes the first confirming value according to the preset authentication code, the first random number, the MAC address of the slave device and the MAC address of the master device, forms the confirming request according to the first confirming value and sends the first confirming request to the slave device;

Further, Step a1 can also be that the master device generates the first random number, receives the preset authentication code input by a user, computes the first confirming value according to the preset authentication code, the first random number, the MAC address of the slave device and the MAC address of the master device, sends the first confirming value as the pairing confirming request to the slave device. Preferably, the preset authentication code is printed on external cover of the master device.

Step a2, the master device receives the second confirming value returned from the slave device, forms the random number exchanging request according to the first random number and sends the random number exchanging request to the slave device;

Step a3, the master device receives the second random number returned from the slave device;

Step a4, the master device verifies, the second confirming value according to the second random number, if verifying is passed, executes Step a5, if verifying is unpassed, displays that pairing fails and waits for operation of the user;

Specifically, the master device computes the second comparing value according to the second random number, the preset authentication code, the currently stored MAC address of the slave device and the MAC address of the master device, compares the second comparing value and the second confirming value, and determine whether the second comparing value and the second confirming value are identical, if yes, verifying is passed; otherwise, verifying is unpassed.

Step a5, the master device computes, the encryption key according to the preset authentication code, the first random number and the second random number;

Step a6, when the master device receives the link encryption request from the slave device, the master device decrypts the link encryption request using the encryption key to obtain the first data, the second data and the third data, takes the first data as the link encryption key and stores the link encryption key, builds a corresponding relation among the second data, the third data and the link encryption key and stores the corresponding relation.

Further, Step a6 may include that the master device forms pairing information, which corresponds to the slave device, according to the MAC address of the slave device, the link encryption key, the second data and the third data and stores the pairing information.

Embodiment 4

Figure 3A:
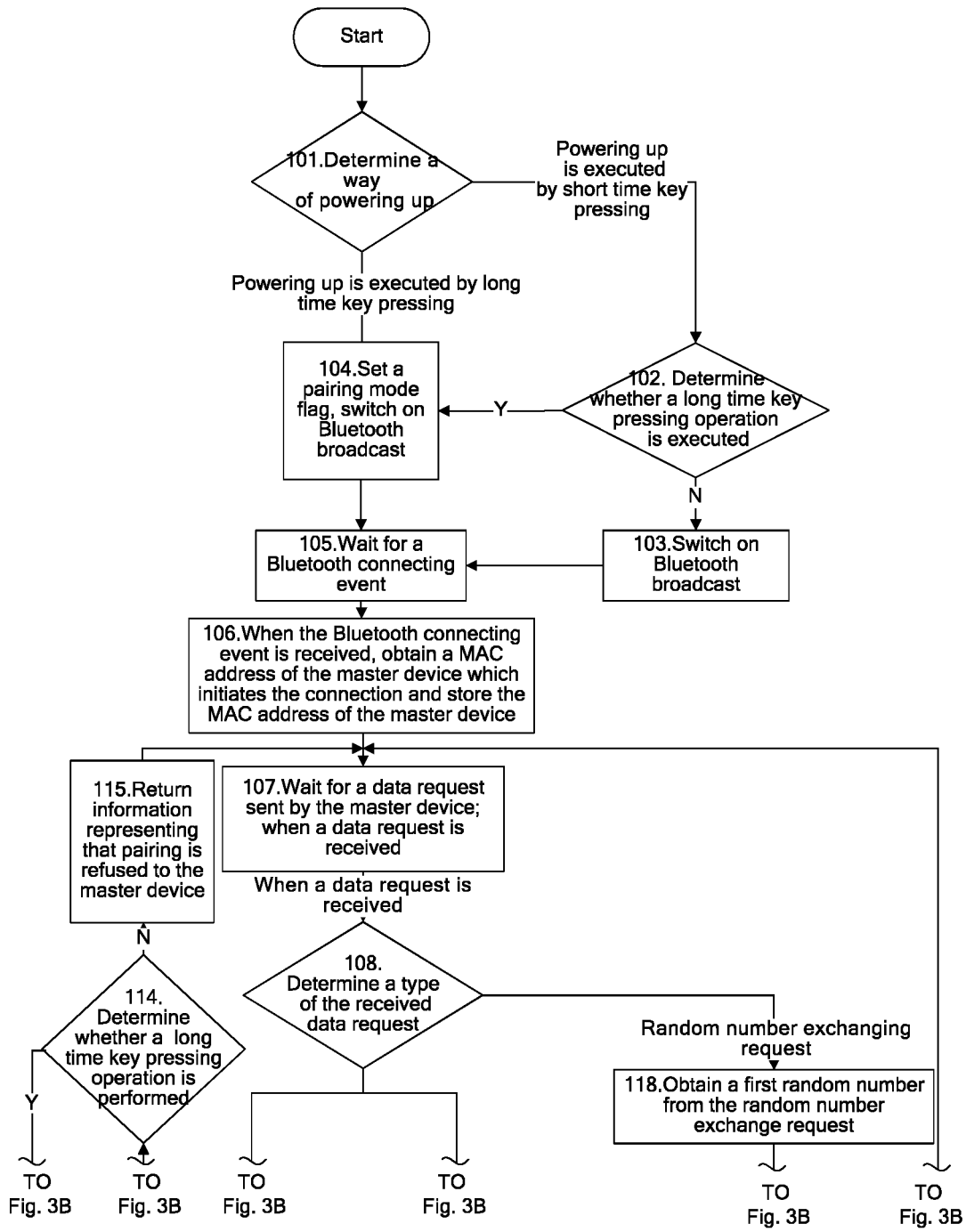
FIG. 3A and FIG. 3B are a flow chart of pairing method of a Bluetooth device provided by Embodiment 4.
Figure 3B:
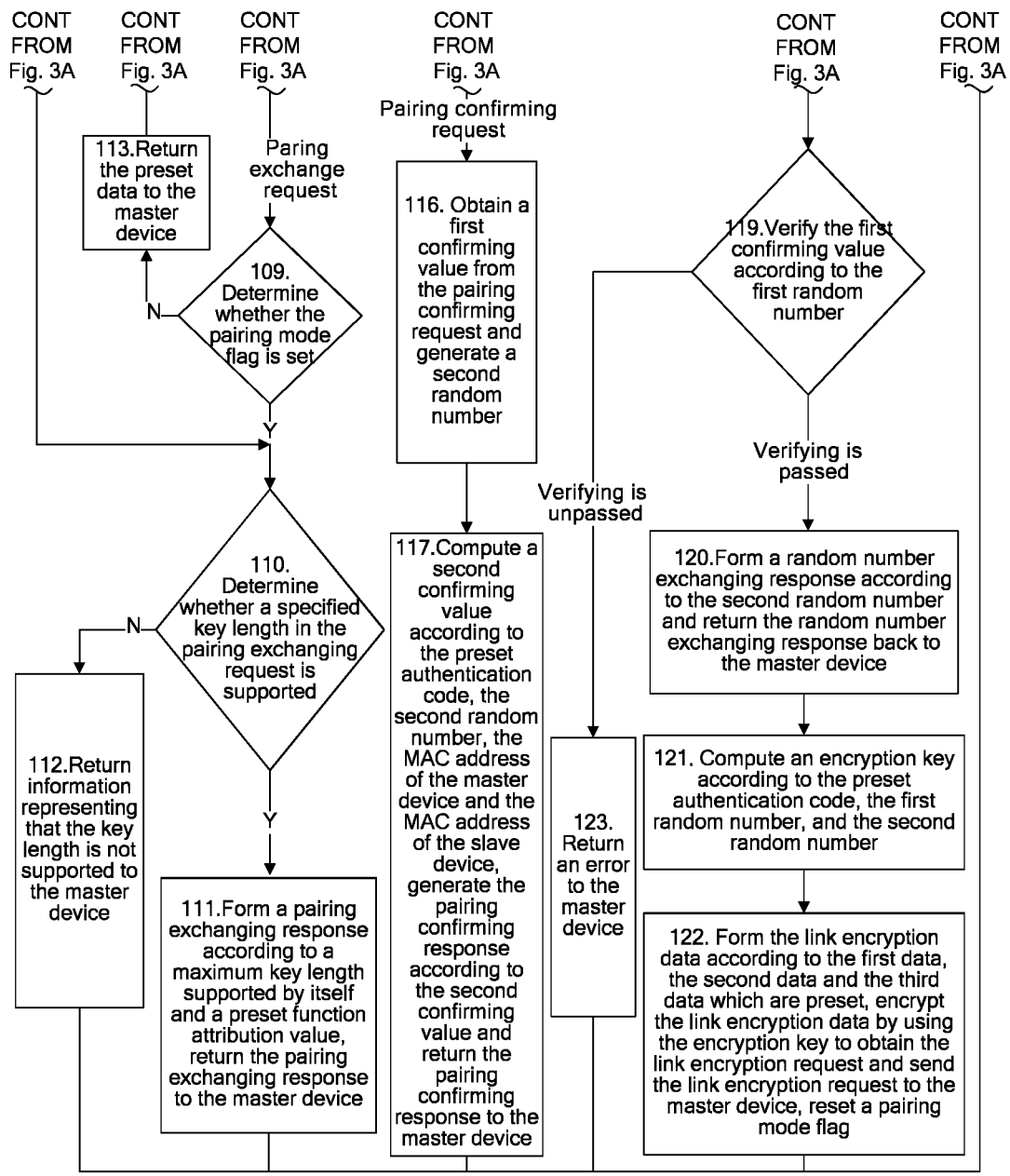

Based on Embodiment 2, FIG. 3A and FIG. 3B are a flow chart of pairing method of a Bluetooth device provided by Embodiment 4. The present embodiment provides a pairing method of a Bluetooth device. The present embodiment gives details by paring a Bluetooth device (slave device) and an initiator (master device) as an example. As shown by FIG. 3A and FIG. 3B, after the slave device is powered up, the slave device executes following steps:

Step 101, determine a way of powering up, if the powering up is executed by long time key pressing, execute Step 104; if powering up is executed by short time key pressing, execute Step 102;

Preferably, the device determines time for pressing a key, if the time reaches 5 seconds, the way of powering up is long time key pressing; otherwise, the way of the powering up is short time key pressing.

Step 102, determine whether a long time key pressing operation is executed, if yes, execute Step 104; otherwise, execute Step 103;

Specifically, determine whether the time for key pressing reaches 5 seconds, if yes, it represents a long time key pressing operation is performed; otherwise, it represents long time key pressing operation is not performed.

Step 103, switch on Bluetooth broadcast, execute Step 105;

Step 104, set a pairing mode flag, switch on Bluetooth broadcast, and execute Step 105;

Step 105, wait for a Bluetooth connecting event;

Step 106, when the Bluetooth connecting event is received, obtain a MAC address of the master device which initiates the connection and store the MAC address of the master device;

For example, the obtained and stored MAC address of the master device is 0xA1 A2 A3 A4 A5 A6.

Step 107, wait for a data request sent by the master device; when a data request is received, execute Step 108;

Step 108, determine a type of the received data request, if the type is a pairing exchanging request, execute Step 109; if the type is a pairing confirming request, execute Step 116; if the type is random number exchanging request, execute Step 118;

Specifically, determine a first octet from the low order bit of the received data request, if the octet is 0x01, the type of the data request is pairing exchanging request, if the octet is 0x03, the type of the data request is pairing confirming request, if the octet is 0x04, the type of the data request is random number exchanging request.

For example, the received pairing exchanging request is: 0x07 07 10 00 00 01 01.

The pairing confirming request is: 0x01 02 03 04 05 06 07 08 09 00 00 00 00 00 00 03.

The random number exchanging request is: 0x00 0F 0E 0D 0C 0B 0A 09 11 22 33 44 55 66 77 88 04.

Step 109, determine whether the pairing mode flag is set, if yes, execute Step 110; otherwise, execute Step 113;

Step 110, determine whether a specified key length in the pairing exchanging request is supported, if yes, execute Step 111; otherwise, execute Step 112;

Specifically, according to order from low order bit to high order bit, structure of the data of the pairing exchanging request is as the following: 0x01, preset function attribution value (1 octet), OOB data flag (1 octet), AuthReq (1 octet), maximum key length (1 octet), Initiator Key Distribution (1 octet), Responder Key Distribution (1 octet), the present step specifically is confirming a specified key length according to the fifth octet from the low order bit of the received pairing exchanging request, determining whether the maximum key length supported by itself is more than or equal to the specified key length, if yes, execute Step 111, otherwise, execute Step 112.

For example, the received pairing exchanging request is 0x07 07 10 00 00 01 01; the specified key length confirmed according to the fifth octet 10 from the low order bit in the pair exchanging request is 16 octets, the maximum key length supported by the device is 8 octets, therefore, determining result of Step 110 is that the device does not support the specified key length.

Step 111, form a pairing exchanging response according to a maximum key length supported by itself and a preset function attribution value and return the pairing exchanging response to the master device, and return to Step 107;

Specifically, according to the order from low order bit to high order bit, structure of data of pairing exchanging response are as the following: 0x02, the preset function attribution value (1 octet), OOB data flag (1 octet), AuthReq (1 octet), the maximum key length (1 octet), Initiator Key Distribution (1 octet), Responder Key Distribution (1 octet).

For example, the key length supported by the device is 8 octets, the preset function attribution value is 0x03, then the pairing exchanging response formed by the present step can be: 0x05 00 08 00 00 03 02.

Step 112, return information representing that the key length is not supported to the master device, and return to Step 107;

For example, an error returned to the master device is 0x06 05, in this case, 05 is an error byte code, 06 is for representing that the reason of an error is that the key length is not supported.

Step 113, return the preset data to the master device.

For example, return 0x82 00 01 02 to the master device.

Step 114, determine whether a long time key pressing operation is performed, if yes, return to Step 110, otherwise, execute Step 115;

Specifically, determine whether a key is pressed and the time for pressing the key reaches 5 seconds, if yes, it represent that a long time key pressing operation is performed, execute Step 110; otherwise, execute Step 115.

Step 115, return information representing that pairing is refused to the master device, return to Step 107;

For example, return 0x 07 05 to the master device, in this case, 05 is an error byte code.

Step 116, obtain a first confirming value from the pairing confirming request and generate a second random number;

Specifically, the data format of the pairing confirming request is: the first confirming value (16 octets) +0x03. The present step specifically is: obtaining the first octet to the sixteenth octet from the high order bit of the pairing request as the first confirming value, generating the second random number with a length of 16 octets.

For example, the pairing confirming request is 0x01 02 03 04 05 06 07 08 09 00 00 00 00 00 00 03; the obtained first confirming value is 0x01 02 03 04 05 06 07 08 09 00 00 00 00 00 00 00. The generated second random number is 0x01 02 03 04 05 06 07 08 99 AA BB CC DD EE FF 00.

Step 117, compute a second confirming value according to the preset authentication code, the second random number, the MAC address of the master device and the MAC address of the slave device, generate the pairing confirming response according to the second confirming value and return the pairing confirming response to the master device, then return to Step 107;

Specifically, AES-128 encryption algorithm is used to perform computing on the preset authentication code, the second random number, the MAC address of the master device and the MAC address of the slave device to obtain the second confirming value(Sconfirm).

Specifically, Sconfirm=e(k, e(k, r XOR p1) XOR p2), where k is the preset authentication code, r is the second random number, p1=pres||preq||rat'||iat', p2=padding ||ia||ra, where pres is pairing exchanging request, preq is pairing exchanging response, rat' is a master device address type, iat' is a slave device address type, is is a MAC address of the master device, ra is a MAC address of the slave device, padding is padding byte.

For example, k=0x00 00 00 00 00 00 00 00 00 00 00 00 00 00 00 00, r=0x01 02 03 04 05 06 07 08 99 AA BB CC DD EE FF 00, p1=0x05 00 08 00 00 03 02 07 07 10 00 00 01 01 00 01, p2=0x00 00 00 00 A1 A2 A3 A4 A5 A6 B1 B2 B3 B4 B5 B6, the second confirming value obtained by computing is 0x1E 1E 3F EF 87 89 88 EA D2 A7 4D C5 BE F1 3B 86.

Preferably, the second confirming value, which is taken as a pairing confirming response, is returned to the master device. For example, return 0x1E 1E 3F EF 87 89 88 EA D2 A7 4D C5 BE F1 3B 86 to the master device.

Step 118, obtain a first random number from the random number exchanging request;

Specifically, the data format of the random number exchanging request is: the first random number (i.e. 16 octets) +0x04. The present step specifically is, obtaining the first octet to the sixteenth octet which start from high order bit as the first random number.

For example, the random number exchanging request is 0x00 0F 0E 0D 0C 0B 0A 09 11 22 33 44 55 66 77 88 04; the obtained first random number is 0x00 0F 0E 0D 0C 0B 0A 09 11 22 33 44 55 66 77 88.

Step 119, verify the first confirming value according to the first random number, if verifying is passed, execute Step 120, if verifying is unpassed, execute Step 123;

Specifically, AES-128 algorithm is used for performing computing on the first random number, the preset authentication code, the currently stored MAC address of the master device and the MAC address of the slave device to obtain a first comparing value. The first comparing value is compared with the first confirming value and whether the first comparing value and the first confirming value are identical is determined, if it is determined that the first comparing value and the first confirming value are identical, verifying is passed; otherwise, verifying is not unpassed.

For example, the first comparing value obtained by computing is 0x1D 1D 3D EF 87 89 88 EA D2 A7 4D C5 BE F1 3B 86, which is not identical to the first confirming value 0x01 02 03 04 05 06 07 08 09 00 00 00 00 00 00 00, therefore, verifying result of the present step is unpassed.

Step 120, form a random number exchanging response according to the second random number and return the random number exchanging response back to the master device;

Specifically, the random number exchanging response is formed according to data structure of the second random number +0x04 and is returned to the master device.

For example, the random number exchanging response returned to the master device is 0x01 02 03 04 05 06 07 08 99 AA BB CC DD EE FF 00 04.

Step 121, compute an encryption key according to the preset authentication code, the first random number, and the second random number;

Specifically, AES-128 encryption algorithm is used for performing computing on the preset authentication code, the first random number, the second random number to obtain the encryption key.

For example, the preset authentication code is 0x00 00 00 00 00 00 00 00 00 00 00 00 00 00 00 00, the first random number is 0x00 0F 0E 0D 0C 0B 0A 09 11 22 33 44 55 66 77 88, the second random number is 0x01 02 03 04 05 06 07 08 99 AA BB CC DD EE FF 00, the encryption key obtained by computing is 0x9A 1F E1 F0 E8 B0 F4 9B 5B 42 16 AE 79 6D A0 62.

Step 122, form the link encryption data according to the first data, the second data and the third data which are preset, encrypt the link encryption data by using the encryption key to obtain the link encryption request and send the link encryption request to the master device, reset a pairing mode flag, and return to Step 107;

Specifically, according to the order from low order bit to high order bit, the slave device forms the link encryption data in the data format as the following: the first data, (i.e. 16 octets), the second data, (i.e. 2 octets), the third data, (i.e. 8 octets).

The present step further includes: obtaining and storing pairing information corresponding to the master device, the pairing information corresponding to the master device includes MAC address of the master device, the first data, the second data and the third data. When the slave device is set with a maximum number of bound devices, the pairing information further includes a bound number. Correspondingly, before the slave device stores the pairing information, the method further includes determining whether a number of bound devices has reached an upper limit value according to a bound number included in the stored pairing information, if yes, clearing a piece of stored pairing information where the bound number is an initial value, setting the bound number corresponding to the current master device as the initial value, obtaining and storing the pairing information corresponding to the master device; otherwise, setting the bound number corresponding to the current master device to be a sum of the maximum value of the bound number included in the currently stored pairing information and 1, obtaining and storing the pairing information corresponding to the master device. For example, the initial value of the bound number is 1; when the bound number equals to 8, it represents that the number of the bound devices has reached upper limit value.

Further, the present step further can be that the slave device generates a third random number as the third data, builds and stores a corresponding relation among the third data, the preset first data, and the preset second data, forms the link encryption data according to the preset first data, the preset second data and the generated third data, encrypts the link encryption data by using the encryption key to obtain the link encryption request and sends the link encryption request to the master device, resets the pairing mode flag, obtains and stores the pairing information corresponding to the master device; return to Step 107.

For example, the first data is 0x4C 68 38 41 39 F5 74 D8 36 BC F3 4E 9D FB 01 BF, the second data is 0x00 00, the third data is 0x00 00 00 00 00 00 00; the encryption key is 0x9A 1F E1 F0 E8 B0 F4 9B 5B 42 16 AE 79 6D A0 62, then the link encryption request obtained by encryption in the present step is 0x46 EA B3 01 AF 64 32 F3 C2 05 56 87 90 52 97 EB.

In the present embodiment, the slave device takes the first data as the link encryption key and stores the link encryption key; a corresponding relation is built among the second data, the third data and the link encryption key, and the corresponding relation is stored.

Further, after the slave device sends the link encryption request to the master device, the slave device further receives the link encryption request response returned by the master device, the slave device determines whether the link encryption request response includes the second data and the third data, if yes, the link encryption key negotiation is successful; otherwise, the link encryption key negotiation is unsuccessful.

Step 123, return an error to the master device, return to Step 107;

For example, the error returned to the master device is 0x04 05; in this case, 05 is an error byte code; 04 represents that an error reason is confirming value mismatched.

What is described above is merely specific implementations of the present disclosure, but does not limit the protection scope of the present disclosure. Variations and substitutions that can be easily figured out by persons skilled in the art within the technical scope disclosed in the present disclosure shall all fall within the protection scope of the present disclosure. Therefore, the protection scope of the present disclosure is subject to the appended claims.

What is claimed is:

1. A working method of a Bluetooth device, comprising a Bluetooth connecting process, a pairing process and a data communicating process between the device and an initiator, wherein the pairing process comprises:

Step S1, when the device receives a pairing confirming request sent from the initiator, obtaining, by the device, a first confirming value from the pairing confirming request and generating a second random number, computing a second confirming value according to a preset authentication code, the second random number, a currently stored MAC address of the initiator and the MAC address of the device and returning the second confirming value to the initiator;

Step S2, when the device receives a random number exchanging request sent from the initiator, obtaining, by the device, a first random number from the random number exchanging request; verifying the first confirming value according to the first random number, executing Step S3 if the verifying is passed; executing Step S5 if the verifying is unpassed;

Step S3, returning, by the device, the second random number to the initiator;

Step S4, computing, by the device, an encryption key according to the preset authentication code, the first random number, the second random number; forming link encryption data according to first data, second data and third data which are preset, encrypting the link encryption data by using the encryption key to obtain a link encryption request and sending the link encryption request to the initiator, taking the first data as a link encryption key, and ending the pairing process;

Step S5, returning, by the device, an error to the initiator, ending the pairing process.

2. The method of claim 1, wherein the verifying the first confirming value according to the first random number specifically is: computing a first comparing value according to the first random number, the preset authentication code, the currently stored MAC address of the initiator and the MAC address of the device, comparing the first comparing value and the first confirming value to determine whether the first comparing value and the first confirming value are identical, if yes, the verifying is passed, otherwise, the verifying is unpassed.

3. The method of claim 1, wherein the pairing process further comprises, executing following steps by the device upon receiving a pairing exchanging request sent from the initiator:

Step A, determining whether a current mode is a pairing mode, if yes, executing Step B, otherwise, executing Step B';

Step B, determining whether a key length specified in the pairing exchanging request is supported, if yes, returning a pairing exchanging response to the initiator; otherwise, returning information representing that the key length is not supported to the initiator; and Step B', returning preset data to the initiator and determining whether a long time key pressing operation is performed, if yes, executing Step B, otherwise, returning information representing that pairing is refused to the initiator;

the method further comprises: setting the current mode as the pairing mode after the device is powered up; modifying, by the device, the current mode as a non-pairing mode after ending the pairing process in Step S4.

4. The method of claim 3, wherein the setting the current mode as the pairing mode after the device is powered up specifically comprise: powering up the device and determining a way of the powering up, determining whether an operation of long time key pressing is performed if the way of the powering up is short time key pressing powering up, if yes, setting a pairing mode flag, switching on Bluetooth broadcast and waiting for a Bluetooth connection; otherwise, switching on the Bluetooth broadcast and waiting for the Bluetooth connection; if the way of the powering up is long time key pressing powering up, setting the pairing mode flag, switching on the Bluetooth broadcast and waiting for the Bluetooth connection;

the modifying the current mode as the non-pairing mode specifically is: resetting the pairing mode flag.

5. The method of claim 1, wherein the Bluetooth connecting process comprises:

Step 1, when the device receives a Bluetooth connecting event, building, by the device, a Bluetooth connection with the initiator which initiates the Bluetooth connection and obtaining the MAC address of the initiator and storing the MAC address of the initiator;

Step 2, waiting, by the device, to receive a data request sent by the initiator, executing Step S1 in a case that the received data request is the pairing confirming request; executing Step S2 in a case that the received data request is the random number exchanging request.

6. The method of claim 5, wherein after the device obtains the MAC address of the initiator in the Step 1, the method further comprises: determining, by the device, whether the initiator is a bound device according to the MAC address of the initiator, if yes, obtaining pairing information corresponding to the initiator according to the MAC address of the initiator and taking the first data in the pairing information as the link encryption key and entering the data communicating process; otherwise executing the Step 2;

the pairing information corresponding to the initiator comprises the MAC address of the initiator, the first data, the second data and the third data.

7. The method of claim 5, wherein, in the Step 1 when the device obtains the MAC address of the initiator and two bits starting from a high order bit of the MAC address of the initiator are preset values, the method further comprises: receiving, by the device, an identity analyzing key of the initiator, determining whether the initiator is a bound device according to the identity analyzing key of the initiator, if yes, obtaining pairing information corresponding to the initiator according to the identity analyzing key of the initiator, taking the first data in the pairing information as the link encryption key and entering the data communication process; otherwise, executing the Step 2;

the pairing information corresponding to the initiator comprises the MAC address of the initiator, the first data, the second data, the third data and the identity analyzing key of the initiator.

8. The method of claim 1, wherein when ending the pairing process in Step S4, the method further comprises: storing, by the device, pairing information corresponding to the initiator for the initiator.

9. The method of claim 8, wherein the pairing information further comprises a bound number; before storing the pairing information corresponding to the initiator, the method further comprises: determining, by the device, whether a number of bound devices has reached an upper limit value according to a bound number comprised in all pairing information stored in the device, if yes, clearing a piece of pairing information from the stored pairing information according to the upper limit value; otherwise, setting the bound number comprised in the pairing information corresponding to the initiator according to the bound number comprised in all the currently stored pairing information.

10. The method of claim 1, wherein the data communication process comprises: upon receiving operating data sent by the initiator, decrypting, by the device, the operating data using the link encryption key, performing a corresponding operation according to a decrypting result, returning an operating response obtained by encrypting with the link encryption key to the initiator.

11. A Bluetooth device, comprising a processor and a memory for storing instructions, which, when executed by the processor cause the processor to execute a Bluetooth connecting process, a pairing process and a data communicating process, wherein the pairing process comprises:

Step S1, receiving a pairing confirming request sent from an initiator, obtaining a first confirming value from the pairing confirming request and generating a second random number; computing a second confirming value according to a preset authentication code, the second random number, a currently stored MAC address of the initiator and a MAC address of the device and returning the second confirming value to the initiator;

Step S2, receiving a random number exchanging request sent from the initiator, obtaining a first random number from the random number exchanging request; verifying the first confirming value according to the first random number, executing Step S3 if the verifying is passed; executing Step S5 if the verifying is unpassed;

Step S3, returning the second random number to the initiator;

Step S4, computing an encryption key according to the preset authentication code, the first random number, the second random number;

forming link encryption data according to first data, second data and third data which are preset, encrypting the link encryption data using the encryption key to obtain a link encryption request and sending the link encryption request to the initiator, taking the first data as a link encryption key, and ending the pairing process;

Step S5, returning an error to the initiator, ending the pairing process.

12. The device of claim 11, wherein the verifying the first confirming value according to the first random number specifically is: computing a first comparing value according to the first random number, the preset authentication code, the MAC address of the initiator and the MAC address of the Bluetooth device, comparing the first comparing value and the first confirming value to determine whether the first comparing value and the first confirming value are identical, if yes, the verifying is passed, otherwise, the verifying is unpassed.

13. The device of claim 11, wherein the instructions further cause the processor to execute the following steps upon receiving a pairing exchanging request sent from the initiator:

Step A, determining whether a current mode is a pairing mode, if yes, executing Step B, otherwise, executing Step B';

Step B, determining whether a key length specified in the pairing exchanging request is supported, if yes, returning a pairing exchanging response to the initiator; otherwise, returning information representing that the key length is not supported to the initiator; and Step B', returning preset data to the initiator and determining whether a long time key pressing operation is performed, if yes, executing Step B, otherwise, returning information representing that pairing is refused to the initiator;

the processor is further configured to execute the following step: setting the current mode as the pairing mode after the device is powered up, and setting the current mode as a non-pairing mode after after ending the pairing process in Step S4.

14. The device of claim 13, wherein the instructions further cause the processor to execute the following step: determining a way of powering up after the device is powered up, if the way of powering up is short time key pressing powering up, determining whether the long time key pressing operation is performed, if yes, setting a pairing mode flag, switching on Bluetooth broadcast and waiting for a Bluetooth connection; otherwise, switching on the Bluetooth broadcast and waiting for the Bluetooth connection; if the way of powering up is long time key pressing powering up, setting the pairing mode flag, switching on the Bluetooth broadcast and waiting for the Bluetooth connection; the modifying the current mode as the non-pairing mode specifically is: resetting the pairing mode flag.

15. The device of claim 11, wherein the Bluetooth connecting process comprises:

Step 1, upon receiving a Bluetooth connecting event, building a Bluetooth connection with the initiator which initiates the Bluetooth connection and obtaining the MAC address of the initiator and storing the MAC address of the initiator;

Step 2, waiting to receive a data request sent by the initiator, executing Step S1 in a case that the received data request is the pairing confirming request executing Step S2 in a case that the received data request is the random number exchanging request.

16. The device of claim 15, wherein the instructions further cause the processor to execute the following steps, after obtaining the MAC address of the initiator, determining whether the initiator is a bound device according to the MAC address of the initiator, if yes, obtaining pairing information corresponding to the initiator according to the MAC address of the initiator, taking the first data in the pairing information as the link encryption key and entering the data communicating process; otherwise, executing the Step 2;

the pairing information of the initiator comprises the MAC address of the initiator, the first data, the second data and the third data.

17. The device of claim 15, wherein the instructions further cause the processor to execute the following steps, upon obtaining the MAC address of the initiator and when two bits starting from a high order bit of the MAC address of the initiator are preset values, receiving an identity analyzing key of the initiator, determining whether the initiator is a bound device according to the identity analyzing key of the initiator, if yes, obtaining pairing information corresponding to the initiator according to the identity analyzing key of the initiator, taking the first data in the pairing information as the link encryption key and entering the data communication process; otherwise, executing the Step 2;

the pairing information corresponding to the initiator comprises the MAC address of the initiator, the first data, the second data and the third data and the identity analyzing key of the initiator.

18. The device of claim 11, wherein the instructions further cause the processor to execute the following step, storing pairing information corresponding to the initiator for the initiator.

19. The device of claim 18, wherein the pairing information further comprises a bound number;

the instructions further cause the processor to execute the following steps, determining whether a number of bound devices has reached an upper limit value according to a bound number comprised in the currently stored pairing information, if yes, after clearing a piece of pairing information in the currently stored pairing information according to the upper limit value, storing the pairing information corresponding to the initiator for the initiator; otherwise, setting the bound number in the pairing information corresponding to the initiator according to the bound number comprised in all the currently stored pairing information, and storing the pairing information corresponding to the initiator for the initiator.

20. The device of claim 11, wherein the instructions further cause the processor to execute the following steps, receiving operating data sent from the initiator, decrypting the operating data by using the link encryption key, performing a corresponding operation according to a decrypting result, returning an operating response obtained by encrypting the link encryption key to the initiator.

\* \* \* \* \*